(12) United States Patent
Huang et al.

(10) Patent No.: US 9,910,346 B2
(45) Date of Patent: Mar. 6, 2018

(54) ILLUMINATION SYSTEM AND PROJECTION APPARATUS

(71) Applicant: Coretronic Corporation, Hsin-Chu (TW)

(72) Inventors: Kuan-Ta Huang, Hsin-Chu (TW); Ming-Tsung Weng, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/335,441

(22) Filed: Oct. 27, 2016

(65) Prior Publication Data

US 2017/0192347 A1 Jul. 6, 2017

(30) Foreign Application Priority Data

Dec. 30, 2015 (TW) .............................. 104144416 A

(51) Int. Cl.
G03B 21/20 (2006.01)
F21V 8/00 (2006.01)
(Continued)

(52) U.S. Cl.
CPC ......... *G03B 21/208* (2013.01); *G02B 6/0006* (2013.01); *G02B 6/0008* (2013.01);
(Continued)

(58) Field of Classification Search
CPC ........... G02B 6/00; G02B 6/42; G03B 21/204
See application file for complete search history.

(56) References Cited

U.S. PATENT DOCUMENTS 8,550,633 B2 10/2013 Utsunomiya
2007/0024825 A1 2/2007 Stephanes Maria De Vaan
(Continued)

FOREIGN PATENT DOCUMENTS

CN 104932188 9/2015
TW 201520603 6/2015
(Continued)

OTHER PUBLICATIONS

"Office Action of Taiwan Counterpart Application", dated Nov. 23, 2016, p. 1-p. 7, in which the listed references were cited.

*Primary Examiner* — Sultan Chowdhury
*Assistant Examiner* — Danell L Owens
(74) *Attorney, Agent, or Firm* — JCIPRNET

(57) ABSTRACT

An illumination system including a first laser light source, a diffusion sheet and a light integration rod is provided. The first laser light source is configured to generate a first laser beam. The diffusion sheet is located on a transmission path of the first laser beam. The light integration rod has a light entering surface and a light exiting surface. The diffusion sheet is located between the first laser light source and the light integration rod. The first laser beam from the diffusion sheet enters the light integration rod through the light entering surface and exits the light integration rod through the light exiting surface. The light integration rod is adapted to convert the first laser beam to an illumination beam. The area of the light entering surface is larger than the area of the light exiting surface. A projection apparatus is also provided.

20 Claims, 8 Drawing Sheets

(51) Int. Cl.
 *G02B 27/09* (2006.01)
 *G02B 27/14* (2006.01)
 *G02B 27/48* (2006.01)
 *G03B 21/00* (2006.01)
 *H04N 9/31* (2006.01)

(52) U.S. Cl.
 CPC ....... *G02B 6/0096* (2013.01); *G02B 27/0916* (2013.01); *G02B 27/0994* (2013.01); *G02B 27/141* (2013.01); *G02B 27/48* (2013.01); *G03B 21/005* (2013.01); *G03B 21/204* (2013.01); *H04N 9/3158* (2013.01); *H04N 9/3161* (2013.01)

(56) References Cited

U.S. PATENT DOCUMENTS

2009/0268168 A1* 10/2009 Wang .................. G02B 27/48
 353/37
2011/0261326 A1* 10/2011 Wang ................ G02B 26/0833
 353/31
2013/0083295 A1* 4/2013 Miyazaki ............. G02B 27/102
 353/31

FOREIGN PATENT DOCUMENTS

| TW | 201520671 | 6/2015 |
| TW | 201530247 | 8/2015 |
| TW | 201542966 | 11/2015 |

* cited by examiner

ILLUMINATION SYSTEM AND PROJECTION APPARATUS

CROSS-REFERENCE TO RELATED APPLICATION

This application claims the priority benefit of Taiwan application serial no. 104144416, filed on Dec. 30, 2015. The entirety of the above-mentioned patent application is hereby incorporated by reference herein and made a part of this specification.

BACKGROUND OF THE INVENTION

Field of the Invention

The invention relates to an optical system and a display apparatus, and particularly relates to an illumination system and a projection apparatus.

Description of Related Art

In recent years, projection apparatuses using solid state light sources such as light emitting diodes (LEDs) and laser diodes are more and more popular on the market. Since laser diodes have a high light emitting efficiency, to break through the limitation of LED light sources, pure color light sources generated by exciting fluorescence and designed form projectors are developed. Besides, in addition to emitting light by exciting fluorescence using laser light sources, laser light may also be directly used as the illuminating light source of a projector in laser projection apparatuses. As laser light has the advantage of being able to adjust the number of light sources based on the brightness requirement, the brightness requirements of various projectors can thus be met. Therefore, the projector structure adopting a light source system using the laser light source has a high potential of replacing the conventional ultra high pressure mercury lamp and becoming the light source of the next-generation projectors.

The conventional laser projectors use a laser light source and make the laser light focus on a fluorescence layer to output fluorescent light with enough intensity. However, the light spot formed by using semiconductor laser is has a shape similar to an ellipse, and the light intensity distribution thereof is similar to a Gaussian distribution. On the other hand, the light spot of the light beam emitted by exciting the fluorescence using laser light is similar to a circular shape and the light intensity distribution thereof is similar to a Lambertian distribution. When the laser beam and the light beam generated by exciting the fluorescence are combined, the illumination is not uniform due to differences in the shapes of light spots and the light intensity distributions. Therefore, the color in an image frame projected by the laser projection apparatus is not uniform, either.

To solve this issue, it is common to dispose a Lambertian diffuser on the path of the laser beam and make the light beam converge on the Lambertian diffuser based on the requirement of a general optical structure. The Lambertian diffuser diffuses the laser beam, such that the shape and size of the light spot and the light intensity distribution of the laser beam become similar to those of the light beam emitted by exciting the fluorescence, so as to make the color of the image frame of the projection apparatus uniform. However, the Lambertian diffuser is very costly. Besides, since the light intensity per unit area at the center of the light spot formed by the laser beam having a light intensity distribution similar to the Gaussian distribution is higher, the energy density is high when the light beam directly converges on the Lambertian diffuser. Thus, there is a risk that the Lambertian diffuser may be burnt.

The information disclosed in the "Description of Related Art" section is only for enhancement of understanding of the background of the described technology, and therefore it may contain information that does not form the prior art that is already known to a person of ordinary skill in the art. Further, the information disclosed in the "Description of Related Art" section does not mean that one or more problems to be resolved by one or more embodiments of the invention were acknowledged by a person of ordinary skill in the art.

SUMMARY OF THE INVENTION

The invention provides an illumination system having a more uniform illumination, lower cost, and longer lifespan.

The invention provides a projection apparatus having a preferable image quality, a lower cost, and a longer lifespan.

Other objects and advantages of the invention can be further illustrated by the technical features broadly embodied and described as follows.

In order to achieve one or a portion of or all of the objects or other objects, an embodiment of the invention provides an illumination system including a first laser light source, a diffusion sheet, and a light integration rod. The first laser light source is adapted to generate a first laser beam. The diffusion sheet is located on a transmitting path of the first laser beam. The light integration rod has a light entering surface and a light exiting surface. The diffusion sheet is located between the first laser light source and the light integration rod, the first laser beam from the diffusion sheet enters the light integration rod through the light entering surface and exits the light integration rod through the light exiting surface, and the light integration rod is adapted to convert the first laser beam into an illumination beam. An area of the light entering surface is greater than an area of the light exiting surface.

In order to achieve one or a portion of or all of the objects or other objects, an embodiment of the invention provides a projection apparatus including an illumination system, a light valve, and a projection lens. The illumination system includes a first laser light source, a diffusion sheet, and a light integration rod. The first laser light source is adapted to generate a first laser beam. The diffusion sheet is located on a transmitting path of the first laser beam. The light integration rod has a light entering surface and a light exiting surface. The diffusion sheet is located between the first laser light source and the light integration rod, the first laser beam from the diffusion sheet enters the light integration rod through the light entering surface and exits the light integration rod through the light exiting surface, and the light integration rod is adapted to convert the first laser beam into an illumination beam. An area of the light entering surface is greater than an area of the light exiting surface. The light valve is disposed on a transmitting path of the illumination beam and adapted to convert the illumination beam into an image beam. The projection lens is disposed on the transmission path of the image beam.

Based on above, the embodiments of the invention has at least one of the following characteristics or effects. In the illumination system and the projection apparatus according to the embodiments of the invention, the light integration rod has the light entering surface and the light exiting surface. The first laser beam from the diffusion sheet enters the light integration rod through the light entering surface and exits the light integration rod through the light exiting surface. In addition, the area of the light entering surface is greater than the area of the light exiting surface. Accordingly, the light integration rod may spread the laser beam, such that the size of the light spot and the light intensity distribution of the laser beam are adjusted, and the light intensity distribution of the laser beam becomes similar to the Lambertian distribution. In this way, the illumination provided by the illumination system may be more uniform. Moreover, the illumination system may use the conventional diffusion sheet, and the focal surface of the laser beam of the illumination system is not located at the diffusion sheet. Consequently, the energy density received by the diffusion sheet is not overly high. Hence, the projection apparatus according to the embodiments of the invention provides a preferable image quality and has a lower cost and longer lifespan.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

It is to be understood that both the foregoing and other detailed descriptions, features and advantages are intended to be described more comprehensively by providing an embodiment accompanied with figures hereinafter. The language used to describe the directions such as up, down, left, right, front, back or the like in the reference drawings is regarded in an illustrative rather than in a restrictive sense. Thus, the language used to describe the directions is not intended to limit the scope of the invention.

Figure 1:
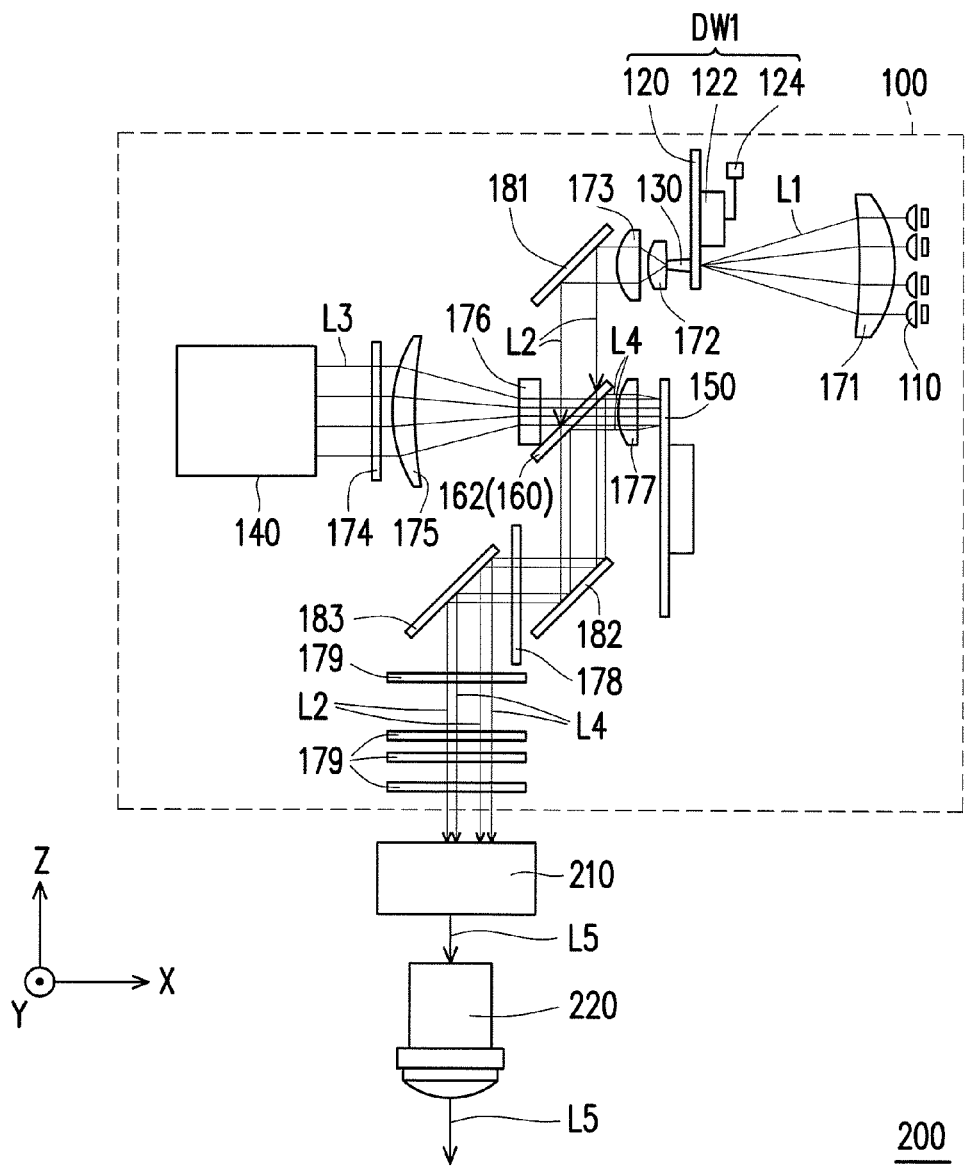
FIG. 1 is a schematic view illustrating a structure of a projection apparatus according to an embodiment of the invention.

FIG. 1 is a schematic view illustrating a structure of a projection apparatus according to an embodiment of the invention. Referring to FIG. 1, a projection apparatus 200 includes an illumination system 100, a light valve 210, and a projection lens 220. In the embodiment, the light valve 210, for example, is a digital micro-mirror device (DMD) or a liquid-crystal-on-silicon panel (LCOS panel). However, in other embodiments, the light valve 210 may also be a transparent liquid crystal panel or other spatial light modulators. The invention does not intend to impose a limitation in this regard.

In this embodiment, the illumination system 100 includes a first laser light source 110, a diffusion sheet 120, and a light integration rod 130. The first laser light source 110 is adapted to generate a first laser beam L1. Specifically, the first laser light source 110 is a semiconductor laser light source, such as a laser diode. For example, the first laser light source 110 may be a blue laser diode bank, and the first laser beam L1 is a blue laser beam, for example. The laser diode bank may be an array of a plurality of laser diodes, 24×24 of laser diodes. However, the invention does not intend to impose a limitation in this regard. In addition, the diffusion sheet 120 is located on a transmitting path of the first laser beam L1, the light integration rod 130 is located on the transmitting path of the first laser beam L1, and the diffusion sheet 120 is located between the first laser light source 110 and the light integration rod 130. Specifically, the first light beam L1 enters the light integration rod 130 after passing through the diffusion sheet 120, and the light integration rod 130 is adapted to convert the first laser beam L1 into an illumination beam L2.

In this embodiment, the illumination system 100 further includes a second laser light source 140 and a wavelength conversion element 150. The second laser light source 140 is adapted to generate a second laser beam L3. Specifically, the second laser light source 140 is a semiconductor laser light source similar to the first laser light source 110, and the second laser beam L3 is a blue laser beam. In addition, the second laser light source 140 may be a laser diode bank as well. The wavelength conversion element 150 is disposed on a transmitting path of the second laser beam L3. Specifically, the wavelength conversion element is a wavelength conversion wheel, such as a phosphor wheel or a fluorescence wheel, for generating a wavelength of a light excited by the exciting light. The wavelength of the generated light is different from the exciting light. However, the invention does not intend to impose a limitation in this regard. In this embodiment, the wavelength conversion element 150 includes at least one wavelength conversion region. The wavelength conversion element 150 is suitable for movement such that the at least one wavelength conversion region of the wavelength conversion element 150 is moved onto the transmitting path of the second laser beam L3 in turn. When the at least one wavelength conversion region is moved onto the transmitting path of the second laser beam L3, the second laser beam L3 is converted into at least one converted beam L4 by the at least one wavelength conversion region.

For example, the wavelength conversion element 150 includes a red wavelength conversion region and a green wavelength conversion region. The red wavelength conversion region and the green wavelength conversion region are moved onto the transmitting path of the second laser beam L3 in turn. When the red wavelength conversion region is moved onto the transmitting path of the second laser beam L3, the second laser beam L3 is converted into a red converted beam L4 by the red wavelength conversion region. When the green wavelength conversion region is moved onto the transmitting path of the second laser beam L3, the second laser beam L3 is converted into a green converted beam L4 by the green wavelength conversion region. Moreover, in this embodiment, each wavelength conversion region includes a reflection plate and a fluorescence region formed by a fluorescence layer (not shown) on the reflection plate. Specifically, colors of the fluorescence layers included in the wavelength conversion regions are different from the color of the second laser beam L3. For example, the color of the fluorescence layer included in the red wavelength conversion region is red, for example, and the color of the fluorescence layer included in the green wavelength conversion region is green, for example. In other embodiments, the wavelength conversion element 150 may also include a wavelength conversion region in a different color, and may convert the second laser beam L3 into the converted beam L4 in a different color. The invention does not intend to impose a limitation in this regard.

Referring to FIG. 1, in this embodiment, the illumination system further includes a light combining unit 160. The light combining unit 160 is located on a transmitting path of the at least one converted beam L4 and the transmitting path of the illumination beam L2. The light combining unit 160 combines the at least one converted beam L4 and the illumination beam L2. Specifically, when the at least one wavelength conversion region is moved onto the transmitting path of the second laser beam L3 in turn, the second laser beam L3 is respectively converted into the at least one red or green converted beam L4 by the at least one wavelength conversion region, and the at least one converted beam L4 may be reflected by the wavelength conversion element 150. In addition, the light combining unit 160 is located on the transmitting path of the at least one converted beam L4. In other words, the at least one converted beam L4 is transmitted to the light combining unit 160.

More specifically, the light combining unit 160 is a dichroic unit 162. The dichroic unit 162 combines the at least one converted beam L4 and the illumination beam L2. For example, in this embodiment, the dichroic unit 162 (the light combining unit 160) may allow a blue light beam to pass through, for example, and reflect a light beam in another color (e.g., red, green, yellow, etc.,). In other words, the dichroic unit 162 (the light combining unit 160) may allow the illumination beam L2 to pass through. In addition, the dichroic unit 162 reflects the at least one converted beam L4, such that the at least one converted beam L4 reflected by the dichroic unit 162 is substantially transmitted along the same transmitting path as that of the illumination beam L2. In some embodiments, the dichroic unit 160 may be a dichroic mirror or a dichroic prism, for example, and may provide different optical functions to beams in different colors. However, the invention does not intend impose any limitation in this regard. Besides, in other embodiments, the dichroic unit 160 may also be a dichroic mirror or a dichroic prism reflecting a blue light beam and allowing a light beam in another color (e.g., red, green, etc.) to pass through. People having ordinary skills in the art are able to take the practical needs into consideration and use the illumination light beam L2 and the converted light beam L4 with a suitable light path design, so as to accomplish a similar light combining effect by using the light combining unit 160. Details in this respect are thus not repeated in the following.

In this embodiment, the projection apparatus 200 is located in a space constructed by a first axis X, a second axis Y, and a third axis Z, for example. In addition, the light integration rod 130, the diffusion sheet 120, and the first laser light source 110 are disposed in sequence along a direction of the first axis X. Also, the first axis X extends along a horizontal direction. In addition, a direction of the third axis Z is perpendicular to the direction of the first axis X and extends along the perpendicular direction. A direction of the second axis Y is perpendicular to the direction of the first axis X and the direction of the third axis Z. The corresponding relations among the components are merely an embodiment of the invention, and the invention is not limited thereto. Specifically, the illumination system 100 of the projection apparatus 200 further includes a lens 171, a lens 172, a lens 173, a lens 174, a lens 175, a lens 176, and a lens 177, and the illumination system 100 further includes a reflection mirror 181. In this embodiment, the lens 171 is disposed between the first laser light source 110 and the diffusion sheet 120, and the lens 171 is disposed on the transmitting path of the first laser light source 110. In addition, the lens 172, the lens 173, and the reflection mirror 181 are located on the transmitting path of the illumination beam L2 and arranged in sequence along the transmitting path of the illumination beam L2. In addition, the lens 172, the lens 173, and the reflection beam 181 are located between the light integration rod 130 and the light combining unit 160.

In this embodiment, the lens 174, the lens 175, and the lens 176 are located on the transmitting path of the second laser beam L3 and arranged in sequence along the transmitting path of the second laser beam L3. Also, the lens 174, the lens 175, and the lens 176 are located between the second laser light source 140 and the light combining unit 160. Moreover, the lens 177 is disposed between the light combining unit 160 and the wavelength conversion unit 150 and located on the transmitting path of the converted beam L4. Specifically, after being emitted by the first laser light source 110, the first laser beam L1 passes through the lens 171 and the diffusion sheet 120 and enters the light integration rod 130. Then, the light integration rod 130 converts the first laser beam L1 into the illumination beam L2. The illumination beam L2 is reflected at the reflection mirror 181 after passing through the lens 172 and the lens 173, and emitted toward the dichroic unit 162 (the light combining unit 160). Meanwhile, after being emitted by the second laser light source 140, the second laser beam L3 passes through the lens 174, the lens 175, and the lens 176 and emitted toward the dichroic unit 162.

In this embodiment, the illumination beam L2 and the second laser beam L3 may pass through the dichroic unit 162. The illumination beam L2 passing through the dichroic unit 162 travels along a direction parallel to the direction of the third axis Z, and the second laser beam L3 passing through the dichroic unit 162 travels along a direction parallel to the direction of the first axis X. The second laser beam L3 passing through the dichroic unit 162 passes through the lens 177 and is emitted toward the wavelength conversion element 150. Specifically, when the at least one wavelength conversion region of the wavelength conversion element 150 is moved onto the transmitting path of the second laser beam L3, the second laser beam L3 is converted into at least one converted beam L4 by the at least one wavelength conversion region. The converted beam L4 is emitted toward the dichroic unit 162 through the lens 177. In this embodiment, the converted beam L4 is reflected at the dichroic unit 162 and travels along a direction parallel to the direction of the third axis Z. Specifically, the illumination beam L2 passing through the dichroic unit 162 is transmitted along a transmitting path substantially the same as a transmitting path of the converted beam L4 after being reflected at the dichroic unit 162.

In this embodiment, the illumination system 100 further includes a lens 178, a plurality of lenses 179, a reflection mirror 182, and a reflection mirror 183. Specifically, the illumination beam L2 that passes through the dichroic unit 162 and the converted beam L4 after being reflected at the dichroic unit 162 sequentially pass through the reflection mirror 182, the lens 178, the reflection mirror 183, and the lenses 179 and are transmitted to the light valve 210. In this embodiment, the lens 171, the lens 172, the lens 173, the lens 174, the lens 175, the lens 176, the lens 177, the lens 178, the lenses 179, the reflection mirror 181, the reflection mirror 182, and the reflection mirror 183 serve as a light transmitting module of the illumination system 100, so as to transmit the illumination beam L2 and the converted beam L4 to the light valve 210.

In this embodiment, colors of the at least one converted beam L4 and the illumination beam L2 are different from each other, and are thus able to be reflected by the dichroic unit 162 and transmitted to the light valve 210. Therefore, when the at least one wavelength conversion region of the wavelength conversion element 150 is moved onto the transmitting path of the second laser beam L3, the second laser beam L3 irradiating the wavelength conversion element 150 may be sequentially converted into beams in a plurality of colors and transmitted to the light valve 210.

In this embodiment, the light valve 210 is disposed on the transmitting path of the illumination beam L2, and the light valve 210 is adapted to convert the illumination beam L2 into an image beam L5. Specifically, the light valve 210 is disposed on the transmitting path of the illumination beam L2 and on the transmitting path of the at least one converted light beam L4. The light valve 210 is adapted to convert the illumination beam L2 and the at least one converted beam L4 into the image beam L5. In addition, the projection lens 220 is disposed on a transmitting path of the image beam L5, so as to project the image beam L5 onto a screen (not shown) to form an image frame. Since the light valve 210 sequentially modulates the illumination beam L2 and the converted beam L4 in different colors after the illumination beam L2 and the at least one converted beam L4 in different colors converge at the light valve 210 to convert the beams into the image beam L5 having different colors and transmit the image beam L5 to the projection lens 220, the image frame projected by the projection lens 220 by using the image beam L5 converted by the light valve 210 may be a colored frame.

Figure 2A:
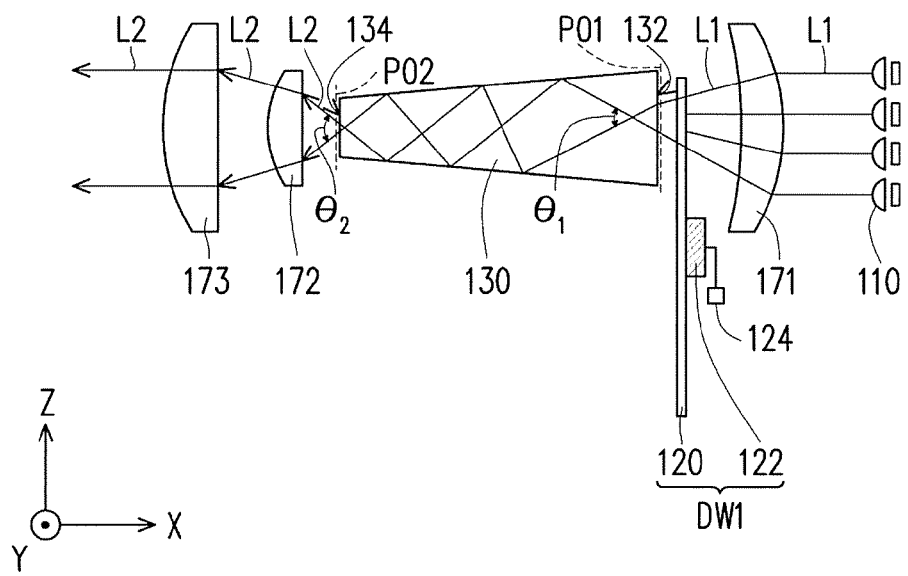
FIG. 2A is a schematic view illustrating a partial structure of an illuminating system of the projection apparatus according to the embodiment shown in FIG. 1.

FIG. 2A is a schematic view illustrating a partial structure of an illuminating system of the projection apparatus according to the embodiment shown in FIG. 1. Referring to FIG. 2A and FIG. 1 together, FIG. 2A illustrates a part of the illumination system 100 of the projection apparatus 200. In addition, to clearly illustrate light paths of the first laser beam L1 and the illumination beam L2, sizes and positions of the respective components in FIG. 2A are not illustrated based on the actual scale. In this embodiment, after being emitted by the first laser light source 110, the first laser beam L1 passes through the lens 171 and converges. Then, after passing through the diffusion sheet 120, the first laser beam L1 passing through the lens 171 enters the light integration rod 130. In addition, a converging focus point of the first laser beam L1 is located in the light integration rod 130, instead of being located on the diffusion sheet 120. Specifically, the diffusion sheet 120 and a rotation axis 122 together form a diffuser wheel DW1. The illumination system 100 further includes an actuator 124 connected to the diffusion sheet 120 and adapted to drive the diffusion sheet 120 to move. The actuator 124 may drive the rotation axis 122 to rotate, for example, so as to drive the diffusion sheet 120 to move in a rotary manner. However, in some embodiments, the actuator 124 may also drive the diffusion sheet 120 to vibrate transitionally. In this embodiment, the diffusion sheet 120 may suitably spread the shape of a light spot of the first laser beam L1 and prevent heat from being accumulated on the diffusion sheet 120 by rotating the diffusion sheet 120. Moreover, since the actuator 124 drives the diffusion sheet 120 to move, the diffusion sheet 120 may remove speckles of the first laser beam L1. Furthermore, in some embodiments, the diffusion sheet 120 that spreads the first laser beam L1 to exhibit a half width at half maximum (HWHM)

of a spread half angle ranging from 3 degrees to 40 degrees may be chosen. Specifically, the diffusion sheet 120 that spreads the first laser beam L1 to exhibit the half width at half maximum of the spread half angle at 5.5 degrees may be chosen. Also, based on practical needs, different types of the diffusion sheet 120 may be chosen, so as to suitably adjust the shape and size of the light spot and the light intensity distribution of the first laser beam L1. However, the invention does not intend to impose a limitation in this regard. Moreover, in different embodiments, the diffusion sheet 120 may be optionally disposed at a position where a focal surface of the first laser beam L1 is located, or not disposed at the position where the focal surface of the first laser beam L1 is located. However, the invention does not intend to impose a limitation in this regard.

Figure 2B:
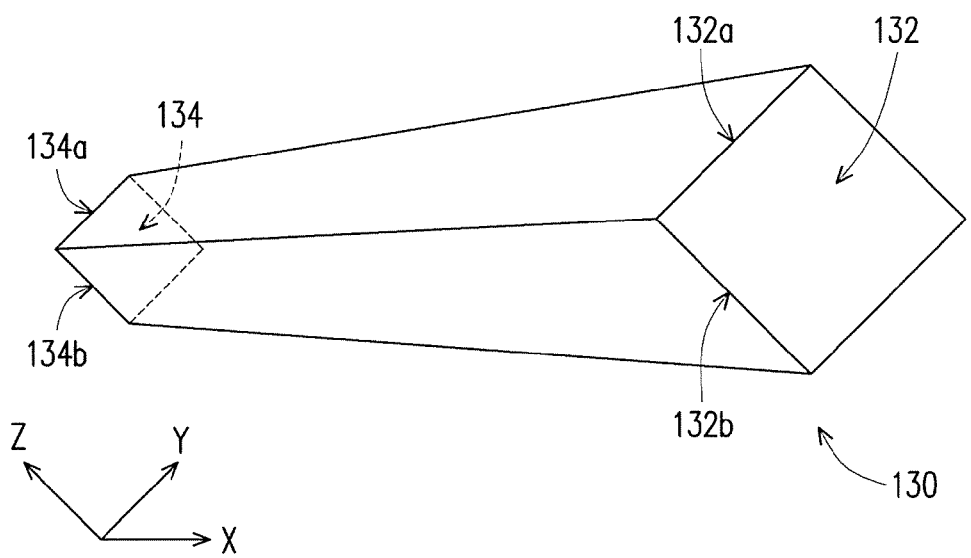
FIG. 2B is a schematic perspective view illustrating a light integration rod of the embodiment shown in FIG. 2A.

FIG. 2B is a schematic perspective view illustrating a light integration rod of the embodiment shown in FIG. 2A. Referring to FIGS. 2A and 2B together, the light integration rod 130 has a light entering surface 132 and a light exiting surface 134. In addition, an area of the light entering surface 132 is greater than an area of the light exiting surface 134. The first laser beam L1 from the diffusion sheet 120 enters the light integration rod 130 through the light entering surface 132 and exits the light integration rod 130 through the light exiting surface 134. Specifically, the shapes of the light entering surface 132 and the light exiting surface 134 are rectangular, such as elongated rectangles or squares. In this embodiment, the light entering surface 132 and the light exiting surface 134 are in the shape of square. However, in some embodiments, the shapes of the light entering surface 132 and the light exiting surface 134 may also be circular, elliptical, hexagonal or irregular shapes. The invention does not intend to impose a limitation in this regard.

In this embodiment, the light entering surface 132 has a first light entering side 132a and a second light entering side 132b perpendicular to the first light entering side 132a. Besides, the light exiting surface 134 has a first light emitting side 134a and a second light emitting side 134b perpendicular to the first light emitting side 134a. Specifically, the first light entering side 132a is parallel to the first light emitting side 134a. A ratio between a length of the first light entering side 132a and a length of the first light emitting side 132b is equal to a ratio between a length of the second light entering side 134a and a length of the second light emitting side 134b. In other words, the shapes of the light entering surface 132 and the light exiting surface 134 are similar. In this embodiment, the ratio between the length of the first light entering side 132a and the length of the first light emitting side 134a is in a range from 1.2 to 3.0. Preferably, the ratio between the length of the first light entering side 132a and the length of the first light emitting side 134a is 2.86, for example. In some embodiments, the lengths of the first light entering side 132a and the first light emitting side 134a may be suitably set based on practical needs. The invention does not intend to impose any limitation in this regard. Moreover, based on practical needs, the light integration rod 130 may be configured to be solid or hollow. The invention does not intend to impose any limitation in this regard, either.

Figure 3A:
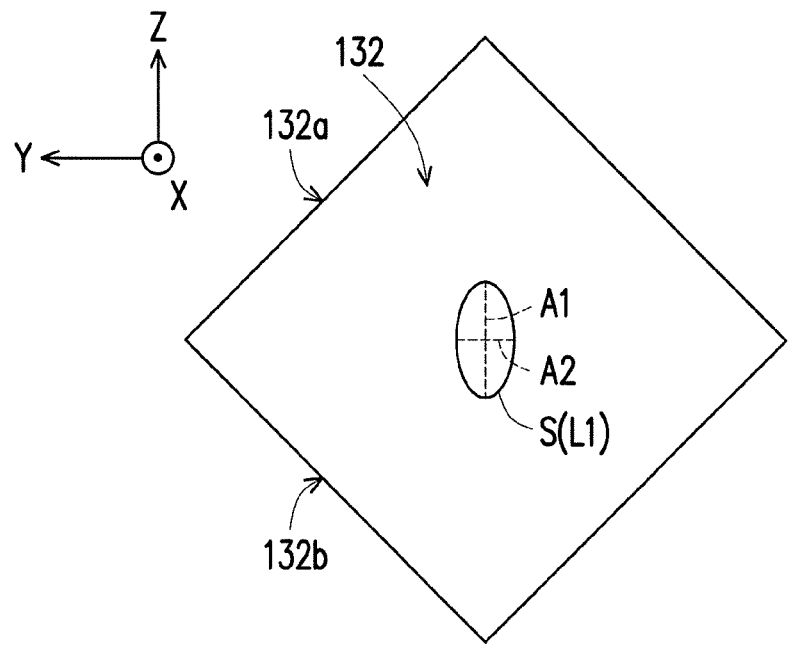
FIG. 3A is a schematic cross-sectional view illustrating a light spot of a first laser beam and a light entering surface of the light integration rod of the embodiment shown in FIG. 2A.

FIG. 3A is a schematic cross-sectional view illustrating a light spot of a first laser beam and a light entering surface of the light integration rod of the embodiment shown in FIG. 2A. Referring to FIGS. 2A, 2B, and 3A together, when the first laser beam L1 exits from a light exiting surface of the first laser light source 110, a dispersion angle of the first laser beam L1 has a fast axis A1 (i.e., a long axis of the first laser beam L1, and the first laser beam L1 has a greater dispersion angle in a long axis direction) and a slow axis A2 (i.e., a short axis of the first laser beam L1, and the first laser beam L1 has a smaller dispersion angle in a short axis direction). In other words, the light beam emitted from the light exiting surface of the first laser light source 110 forms an elliptical cone, and the shape of a light spot S of the first laser beam L1 generated on a surface after the first laser beam L1 travels a distance is elliptical. In this embodiment, the fast axis A1 is substantially parallel to the direction of the third axis Z, and the slow axis A2 is substantially parallel to the direction of the second axis Y. An included angle is provided between the fast axis A1 of the first laser beam L1 and the first light entering side 132a, and the included angle substantially falls with a range from 30 degrees to 60 degrees. Preferably, the included angle is substantially 45 degrees. In some other embodiments, the included angle between the fast axis A1 and the first light entering side 132a may also bet set at other values. The invention does not intend to impose any limitation in this regard.

Continuing to refer to FIG. 2A, in this embodiment, after entering the light integration rod 130 through the light entering surface 132, the first laser beam L1 undergoes multiple total reflections inside the light integration rod 130 and exits the light integration rod 130 through the light exiting surface 134. During a transmission process of the first laser beam L1 inside the light integration rod 130, the light integration rod 130 makes the first laser beam L1 more uniform. Thus, the first laser beam L1 is converted into the illumination beam L2 whose light intensity is uniformly distributed on the light exiting surface 134. The illumination beam L2 exits the light integration rod 130 through the light exiting surface 134, and a light shape of the illumination beam L2 is suitably adjusted by using the lens 172 and the lens 173. In this embodiment, the first laser beam L1 enters the light integration rod 130 through the light entering surface 132 at a light dispersion angle $\theta_1$, and the illumination beam L2 exits the light dispersion rod 130 through the light exiting surface 134 at a light dispersion angle $\theta_2$. In addition, the light dispersion angle $\theta_2$ angle is greater than the light dispersion angle $\theta_1$.

Specifically, since the area of the light entering surface 132 is greater than the area of the light exiting surface 134, when the first laser beam L1 undergoes multiple reflections inside the light integration rod 130 and is transmitted toward the light exiting surface 134, a reflection angle of the first laser beam L1 in the light integration rod 130 becomes greater as the number of times of reflections increases. Thus, the first laser beam L1 is gradually spread during the transmission process inside the light integration rod 130. Namely, when the first laser beam L1 is converted into the illumination beam L2 and emitted from the light exiting surface 134, the size of the light spot of the first laser beam L1 and the light intensity distribution thereof are adjusted. Specifically, the light spot of the illumination beam L2 has a suitable shape and size. Also, the illumination beam L2 also has a suitable light intensity distribution, such as a light intensity distribution similar to a Lambertian distribution. Also, due to the included angle between the fast axis A1 of the first laser beam L1 and the first light entering side 132a, the light integration rod 130 may generate different spreading effects to a degree of light dispersion in the directions of the fast axis A1 and the slow axis A2. Specifically, when the included angle between the fast axis A1 and the first light entering side 132a is 45 degrees, for example, the light spot S of the first laser beam L1 (the illumination beam L2) generated on a surface after the first laser beam L1 (the illumination beam L2) travels a distance may become closer to a circle. Also, the light intensity distribution of the first laser beam L1 (the illumination beam L2) may become more uniform.

In this embodiment, since the light spot of the illumination beam L2 formed from the first laser beam L1 adjusted by the light integration rod 130 has a suitable shape and size and the illumination beam L2 has a suitable light intensity distribution, such as the Lambertian distribution, the illumination system 100 is capable of providing more uniform illumination. Besides, when the light combining unit 160 combines the illumination beam L2 and the converted beam L4, the shape and size of the light spot and the light intensity distribution of the illumination beam L2 are very close to the shape and size of the light spot and the light intensity distribution of the converted beam L4. When the light valve 210 converts the illumination beam L2 and the converted beam L4 into the image beam L5, and the image beam L5 is projected to the screen through the projection lens 220 to form the image frame, the color of the image frame is more uniform. Thus, the projection apparatus 100 is capable of providing a preferable image quality. In addition, since the shape and size of the light spot and the light intensity distribution of the illumination beam L2 are mainly adjusted by the light integration rod 130, the conventional diffusion sheet 120, instead of a more costly Lambertian diffuser, may be used in the illumination system 100. Thus, the cost of the illumination system 100 is lower. Moreover, since the focal surface of the first laser beam L1 in the illumination system 100 may not be located on the diffusion sheet 120, the first laser beam L1 does not directly converge at the diffusion sheet 120. The diffusion sheet 120 may be prevented from being burnt due to an overly high intensity of energy received. In other words, the diffusion sheet 120 is less likely to be damaged when being used, and the projection apparatus 100 thus has a longer lifespan.

Figure 3B:
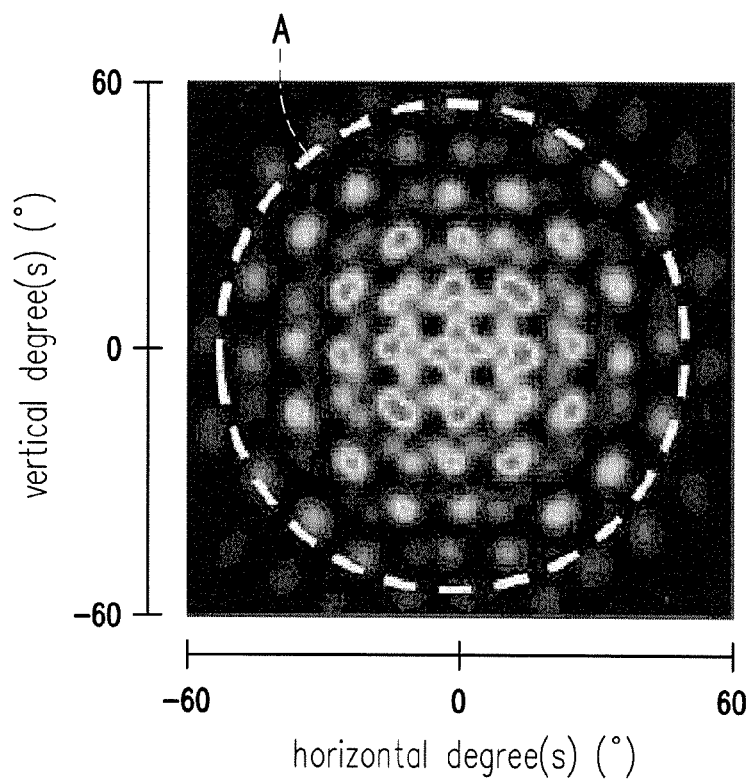
FIG. 3B is a simulation view (angular space) illustrating a light intensity distribution at a light exiting surface (second position) of the light integration rod of the embodiment shown in FIG. 2A.

FIG. 3B is a simulation view (angular space) illustrating a light intensity distribution at a light exiting surface (second position) of the light integration rod of the embodiment shown in FIG. 2A. Referring to FIGS. 2A, 3A, and 3B, in FIG. 3B, the horizontal axis indicates "horizontal angle", and the unit is "degree(s) (°)", whereas the vertical axis indicates "vertical angle", and the unit is "degree(s) (°)". Also, in FIG. 3B, an area with a higher luminance has a light intensity greater than that of an area with a lower luminance. An area A of FIG. 3B shows a light intensity distribution of the illumination beam L2 at respective angles on a horizontal surface and a light intensity distribution of the illumination beam L2 at respective angles on a vertical surface at a position (i.e., a second position PO2) of the light exiting surface 134 of the light integration rod 130. Specifically, due to the included angle between the fast axis A1 of the first laser beam L1 and the first light entering side 132a of the light integration rod 130, the light intensity distribution of the illumination beam L2 is uniform. In addition, the light spot S of the illumination beam L2 generated on a surface after the illumination beam L2 travels a distance may become more similar to a circle.

Figure 4A:
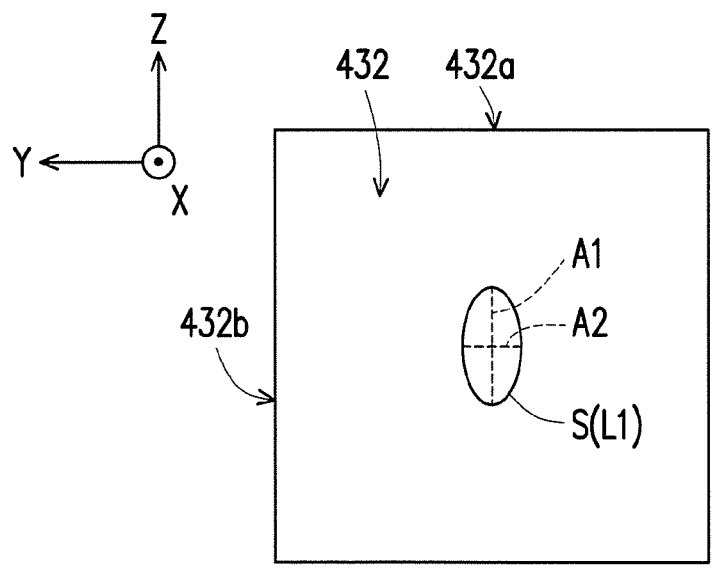
FIG. 4A is a schematic cross-sectional view illustrating a light spot of a first laser beam and a light entering surface of a light integration rod according to another embodiment of the invention.

FIG. 4A is a schematic cross-sectional view illustrating a light spot of a first laser beam and a light entering surface of a light integration rod according to another embodiment of the invention. Referring to FIG. 4, in this embodiment, the projection apparatus 200 and the illumination system 100 as shown in the embodiment of FIG. 1 are used. In addition, a light integration rod of the illumination system 100 of this embodiment is similar to the light integration rod 130 in the embodiment of FIG. 2A. However, a light entering surface 432 of the integration rod of this embodiment has a first light entering side 432a and a second light entering side 432b perpendicular to the first light entering side 432a. Specifically, the fast axis A1 of the first laser light source 110 is substantially parallel to the direction of the third axis Z, and the slow axis A2 is substantially parallel to the direction of the second axis Y. Furthermore, the fast axis A1 is substantially parallel to the second light entering side 432b, and the slow axis A2 is substantially parallel to the first light entering side 432a. However, the invention does not intend to impose a limitation is this regard. In this embodiment, the spreading effect of the light integration rod to the degree of light dispersion of the first laser beam L1 in the fast axis A1 is the equal to the spreading effect of the light integration rod to the degree of light dispersion of the first laser beam L1 in the slow axis A2. In other words, the light spot S of the first laser beam L1 of this embodiment generated on a surface after the first laser beam L1 passes through the light integration rod and travels a distance substantially remains elliptical.

Figure 4B:
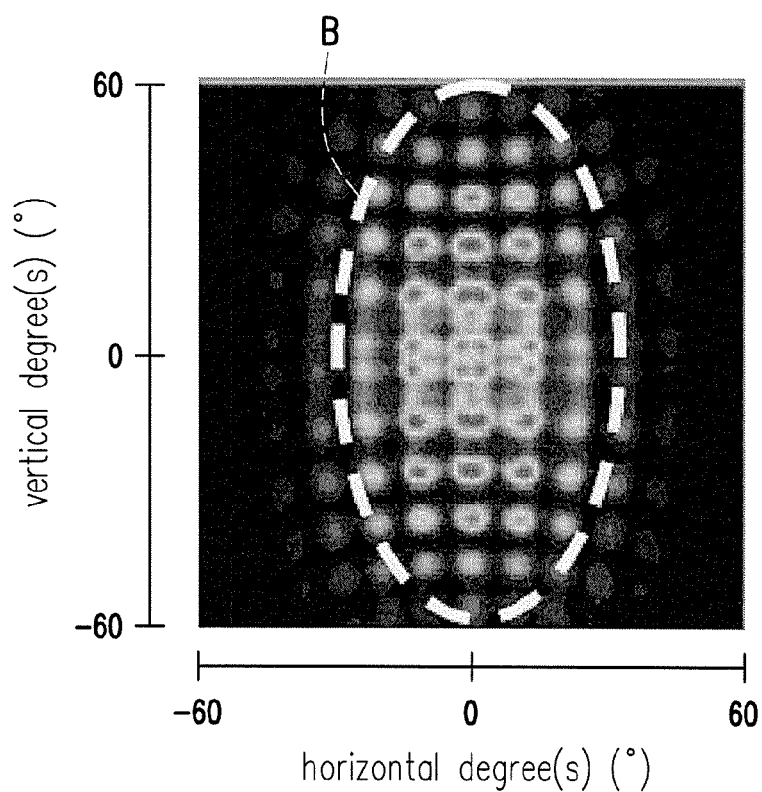
FIG. 4B is a simulation view (angular space) illustrating a light intensity distribution at a light exiting surface of the light integration rod of the embodiment shown in FIG. 4A.

FIG. 4B is a simulation view (angular space) illustrating a light intensity distribution at a light exiting surface of the light integration rod of the embodiment shown in FIG. 4A. Referring to FIGS. 4A and 4B, in FIG. 4B, the horizontal axis indicates "horizontal angle", and the unit is "degree(s)", whereas the vertical axis indicates "vertical angle", and the unit is "degree(s)". Also, in FIG. 4B, an area with a higher luminance has a light intensity greater than that of an area with a lower luminance. An area B of FIG. 4B shows a light intensity distribution of the beam formed after the first laser beam L1 passes through the light integration rod at respective angles on a horizontal surface and a light intensity distribution of the beam forming after the first laser beam L1 passes through the light integration rod at respective angles on a vertical surface at the light exiting surface (not shown) of the light integration rod. Specifically, since the fast axis A1 of the first laser beam L1 is substantially parallel to the second light entering side 432b, and the slow axis A2 is substantially parallel to the first light entering side 432a, the light spot S of the beam formed after the first laser beam L1 passes through the light integration rod formed on a surface after the light beam travels a distance still substantially remains elliptical.

Figure 5A:
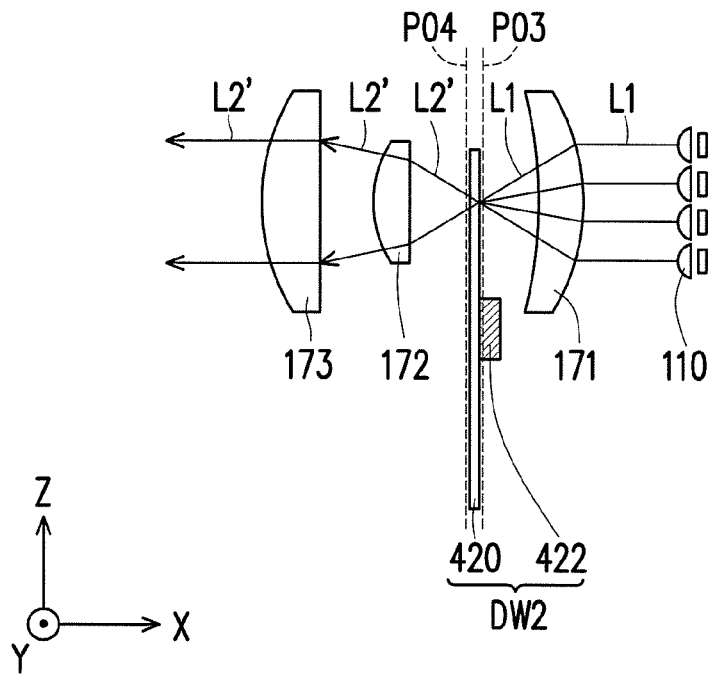
FIG. 5A is a schematic view illustrating a partial structure of a conventional illumination system of a projection apparatus for comparison with the embodiments of the invention.

FIG. 5A is a schematic view illustrating a partial structure of a conventional illumination system of a projection apparatus for comparison with the embodiments of the invention. Referring to FIG. 5A, the embodiment for comparison uses a projection apparatus and an illumination system similar to the projection apparatus 200 and the illumination system 100 of the embodiment shown in FIG. 1. Comparing the conventional illumination system and the illumination system 100 according to the embodiment shown in FIG. 1, the difference lies in that the conventional illumination system shown in FIG. 5A does not include a light integration rod, and the first laser beam L1 converges at a diffusion sheet 420 after being emitted by the first laser light source 110. In addition, the diffusion sheet 420 and a rotation axis 422 together form a diffusion sheet wheel DW2. Specifically, the diffusion sheet 420 is disposed at the position where the focal surface of the first laser beam L1 is located, and the diffusion sheet 420 is a Lambertian diffuser, for example. Therefore, the diffusion sheet 420 is capable of adjusting the shape and size of the light spot and the light intensity distribution of the first laser beam L1, so as to convert the first laser beam L into an illumination beam L2'.

Figure 5B:
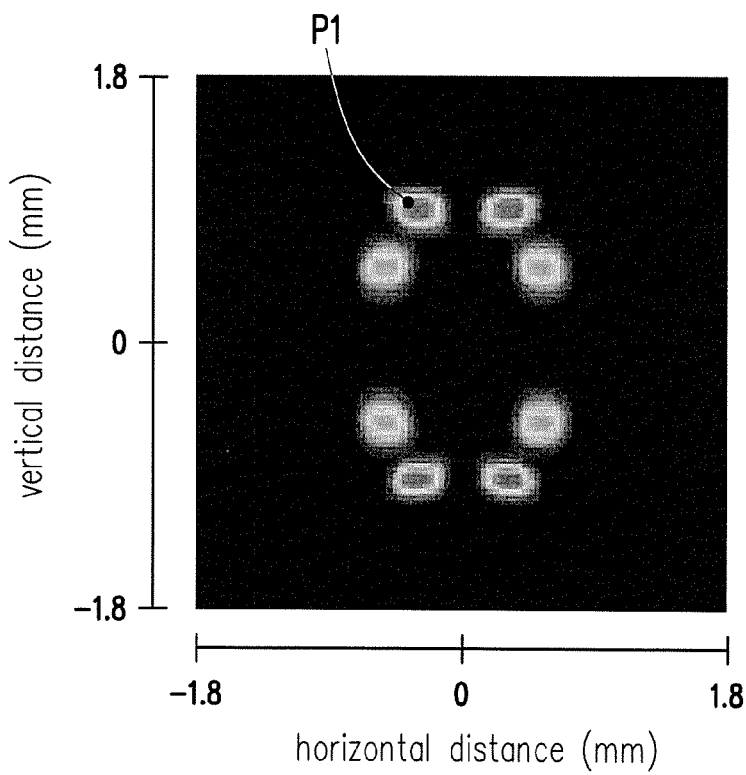
FIG. 5B is a simulation view (position space) illustrating a light intensity distribution at a first position of the embodiment of FIG. 2A.
Figure 5C:
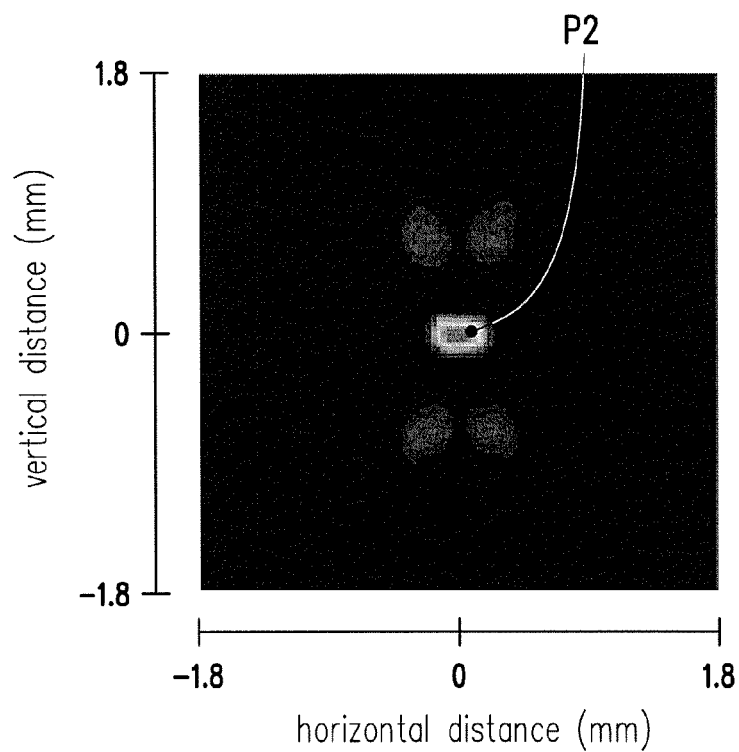
FIG. 5C is a simulation view (position space) illustrating a light intensity distribution at a first position of the conventional illumination system of FIG. 5A.

FIG. 5B is a simulation view (position space) illustrating a light intensity distribution at a first position of the embodiment of FIG. 2A, and FIG. 5C is a simulation view (position space) illustrating a light intensity distribution at a first position of the conventional illumination system of FIG. 5A for comparison. Referring to FIGS. 5B and 5C at the same time, in FIGS. 5B and 5C, the horizontal axis indicates "horizontal distance", and the unit is "millimeter(s) (mm)", whereas the vertical axis indicates "vertical distance", and the unit is "mm(s)". Also, in FIGS. 5B and 5C, an area with a higher luminance has a light intensity greater than that of an area with a lower luminance. FIG. 5B shows a light intensity distribution of the first laser beam L1 in the horizontal direction and a light intensity distribution in the vertical direction of the first laser beam L1 at a position (i.e., a first position PO1) of the light entering surface 132 of the light integration rod 130 of the embodiment shown in FIG. 2A. In addition, FIG. 5C shows a light intensity distribution of the first laser beam L1 in the horizontal direction and a light intensity distribution of the first laser beam L1 in the vertical direction at a side (i.e., a first position PO3) of the diffusion sheet 420 closer to the first laser light source 110 in the conventional illumination system shown in FIG. 5A. Referring to FIG. 5B, since the focal surface of the first laser beam L1 in the embodiment shown in FIG. 2A is not located at the diffusion sheet 120, FIG. 5B shows a plurality of areas with a higher light intensity formed by the first laser beam L1 emitted by the laser diode bank implemented as the first laser light source 110. Since the areas with a higher light intensity do not converge, energy densities of the areas with a higher light intensity are not overly high. In this embodiment, the position P1 is located in the areas with a higher light intensity, and a simulated light intensity at the position P1 is 80 watts per square millimeter (W/mm$^2$), for example.

Then, referring to FIG. 5C, since the focal surface of the first laser beam L1 in the conventional illumination system shown in FIG. 5A is located at the diffusion sheet 420, it is shown in FIG. 5C that the first laser beam L1 emitted by the laser diode bank implemented as the first laser light source 110 forms a single area with a higher light intensity. Since the energy of the laser diode bank converges at the single area, the energy density in this area is higher. In this embodiment, the position P2 is located in the area with a higher light intensity, and a simulated light intensity at the position P2 is 320 W/mm$^2$, for example.

Figure 5D:
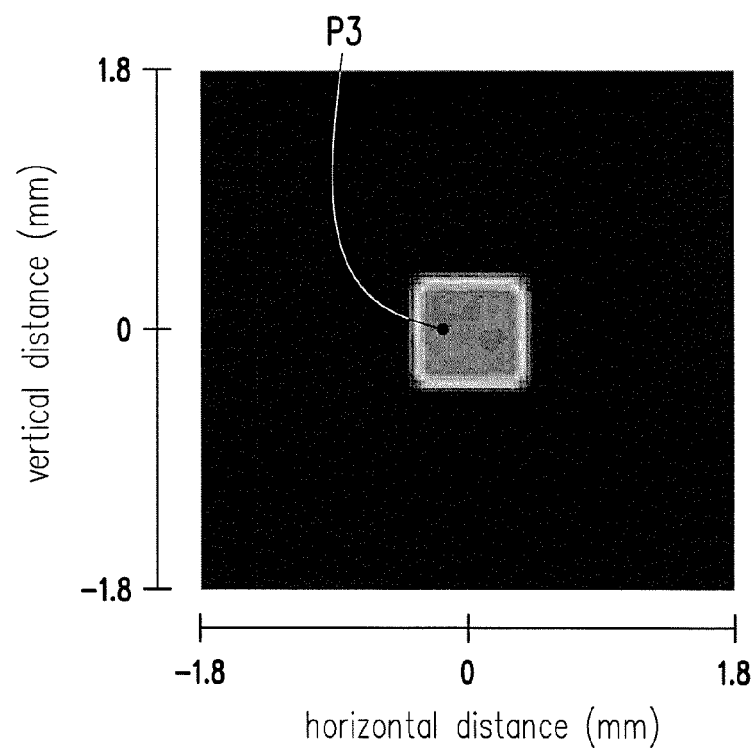
FIG. 5D is a simulation view (position space) illustrating a light intensity distribution at the second position of the embodiment of FIG. 2A.
Figure 5E:
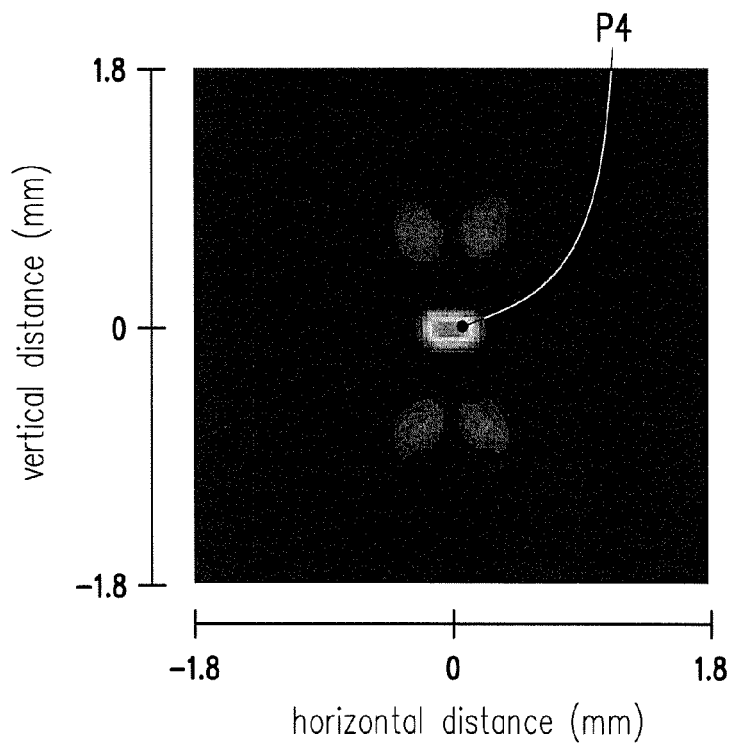
FIG. 5E is a simulation view (position space) illustrating a light intensity distribution at a second position of the conventional illumination system of FIG. 5A.

FIG. 5D is a simulation view (position space) illustrating a light intensity distribution at the second position of the embodiment of FIG. 2A, and FIG. 5E is a simulation view (position space) illustrating a light intensity distribution at a second position of the conventional illumination system of FIG. 5A. Referring to FIGS. 5D and 5E at the same time, in FIGS. 5D and 5E, the horizontal axis indicates "horizontal distance", and the unit is "millimeter(s) (mm)", whereas the vertical axis indicates "vertical distance", and the unit is "mm(s)". Also, in FIGS. 5D and 5E, an area with a higher luminance has a light intensity greater than that of an area with a lower luminance. FIG. 5D shows a light intensity distribution of the second illumination beam L2 (i.e., the first laser beam L1 passing through the light integration rod 130) in the horizontal direction and a light intensity distribution of the second illumination beam L2 (i.e., the first laser beam L1 passing through the light integration rod 130) in the vertical direction at the position (i.e., the second position PO2) of the light exiting surface 134 of the light integration rod 130 in the embodiment of FIG. 2A. In addition, FIG. 5E shows a light intensity distribution of the illumination beam L2' (i.e., the first laser beam L1 passing through the diffusion sheet 420) in the horizontal direction and a light intensity distribution of the illumination beam L2' (i.e., the first laser beam L1 passing through the diffusion sheet 420) in the vertical direction at the side (i.e., the second position PO4) of the diffusion sheet 420 away from the first laser light source 110 in the conventional illumination system shown in FIG. 5A. Referring to FIG. 5D, in the embodiment of FIG. 2A, the light integration rod 130 makes the light intensity distribution of the first laser beam L1 more uniform after the first laser beam L1 passes through the diffusion sheet 120 and enters the light integration rod 130. In this embodiment, the position P3 is located in an area where the illumination beam L2 is emitted from the light exiting surface 134, and a simulated light intensity at the position P3 is 62 W/mm$^2$, for example.

Then, referring to FIG. 5E, since the first laser beam L1 does not pass through the light integration rod 130, the illumination beam L2' (i.e., the first laser beam L1) passing through the diffusion sheet 420 maintains an energy intensity similar to the original energy intensity. In this embodiment, the position P4 is located in an area where the illumination beam L2' is emitted from the side of the diffusion sheet 420 away from the first laser light source 110, and a simulated light intensity at the position P4 is 320 W/mm$^2$, for example.

Figure 5F:
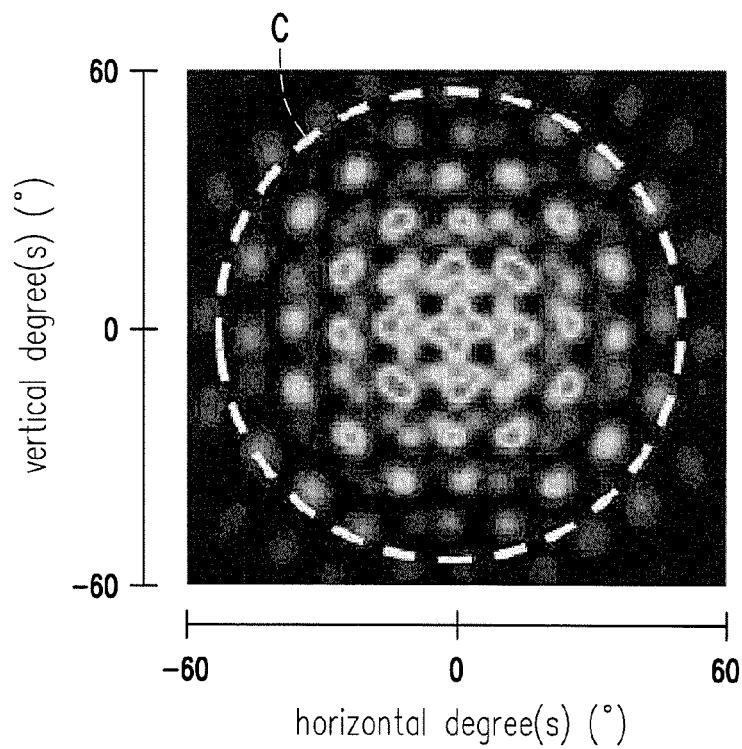
FIG. 5F is a simulation view (angular space) illustrating a light intensity distribution at the second position of the embodiment of FIG. 2A.
Figure 5G:
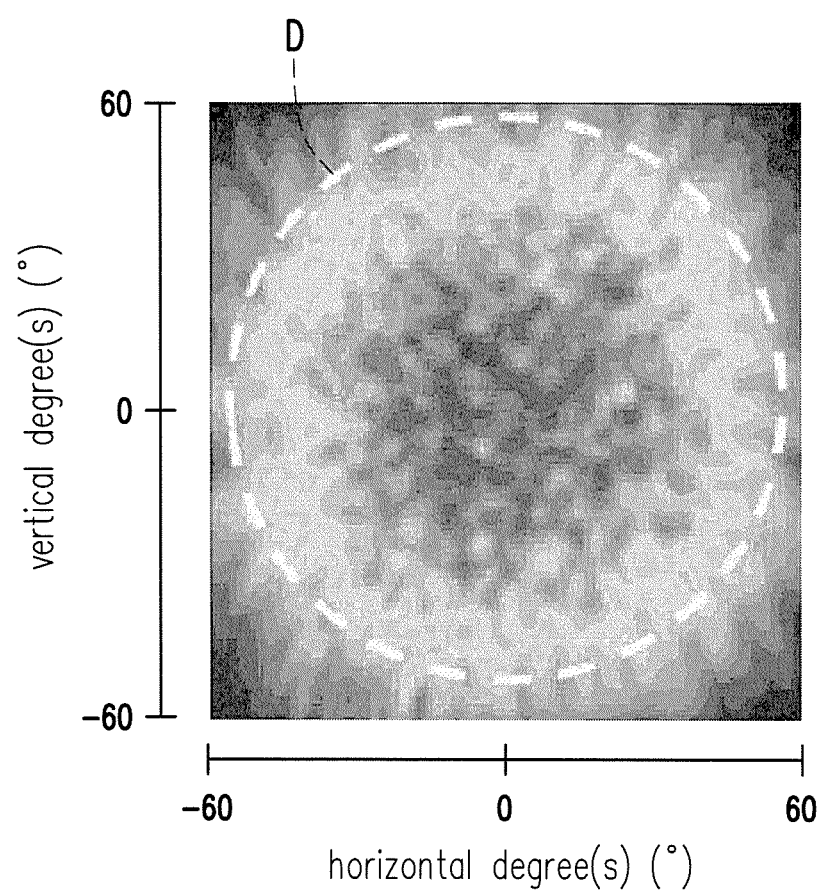
FIG. 5G is a simulation view (angular space) illustrating a light intensity distribution at the second position of the conventional illumination system of FIG. 5A.

FIG. 5F is a simulation view (angular space) illustrating a light intensity distribution at the second position of the embodiment of FIG. 2A, and FIG. 5G is a simulation view (angular space) illustrating a light intensity distribution at the second position of the conventional illumination system of FIG. 5A. Referring to FIGS. 5F and 5G, in FIGS. 5F and 5G, the horizontal axis indicates "horizontal angle", and the unit is "degree(s)", whereas the vertical axis indicates "vertical angle", and the unit is "degree(s)". Also, an area with a higher luminance has a light intensity greater than that of an area with a lower luminance. An area C of FIG. 5F shows a light intensity distribution of the illumination beam L2 at respective angles on a horizontal surface and a light intensity distribution of the illumination beam L2 at respective angles on a vertical surface at a position (i.e., the second position PO2) of the light exiting surface 134 of the light integration rod 130. In addition, an area D of FIG. 5G shows a light intensity distribution of the illumination beam L2' in the horizontal direction and a light intensity distribution of the illumination beam L2' in the vertical direction at a side (i.e., the second position PO4) of the diffusion sheet 420 away from the first laser light source 110. Specifically, the illumination system 100 of the projection apparatus 200 in the embodiment shown in FIG. 2A has the light integration rod 130, and the included angle is provided between the fast axis A1 of the first laser beam L1 and the first light entering side 132a of the light integration rod 130. Therefore, the light intensity distribution of the illumination beam L2 is uniform. In addition, the light spot S of the illumination beam L2 generated on a surface after the illumination beam L2 travels a distance may become more similar to a circle.

It shall be understood that the simulation views of light intensity distribution in FIGS. 3B, 4B, 5B, 5C, 5D, 5E, 5F, and 5G merely serve as some embodiments of the invention and shall not be construed as limitations of the invention. After referring to the invention, people having ordinary skills in the art may apply the principle of the invention and make suitable adjustment to the parameters or setting thereof that changes the numerical values that are set. However, such changes still fall within the scope of the invention.

In view of the foregoing, in the illumination system and the projection apparatus according to the embodiments of the invention, the light integration rod has the light entering surface and the light exiting surface. The first laser beam from the diffusion sheet enters the light integration rod through the light entering surface and exits the light integration rod through the light exiting surface. In addition, the area of the light entering surface is greater than the area of the light exiting surface. Accordingly, the light integration rod may spread the laser beam, such that the size of the light spot and the light intensity distribution of the laser beam are adjusted, and the light intensity distribution of the laser beam becomes similar to the Lambertian distribution. In this way, the illumination provided by the illumination system may be more uniform. Moreover, the illumination system may use the conventional diffusion sheet, and the focal surface of the laser beam of the illumination system is not located at the diffusion sheet. Consequently, the energy density received by the diffusion sheet is not overly high. Hence, the projection apparatus according to the embodiments of the invention provides a preferable image quality and has a lower cost and longer lifespan.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
a first laser light source, adapted to generate a first laser beam;
a diffusion sheet, located on a transmitting path of the first laser beam; and
a light integration rod, having a light entering surface and a light exiting surface, wherein the diffusion sheet is located between the first laser light source and the light integration rod, the first laser beam from the diffusion sheet enters the light integration rod through the light entering surface and exits the light integration rod through the light exiting surface, and the light integration rod is adapted to convert the first laser beam into an illumination beam, and an area of the light entering surface is greater than an area of the light exiting surface,
wherein the illumination system further comprises a second laser light source, a wavelength conversion element and a light combining unit, wherein the second laser light source is adapted to generate a second laser beam, and the wavelength conversion element is disposed on a transmitting path of the second laser beam to convert the second laser beam into at least one converted beam, and the light combining unit is disposed on a transmitting path of the at least one converted beam from the wavelength conversion element and a transmitting path of the illumination beam from the light integration rod.

2. The illumination system of claim 1, wherein shapes of the light entering surface and the light exiting surface are rectangular, the light entering surface has a first light entering side and a second light entering side perpendicular to the first light entering side, the light exiting surface has a first light emitting side and a second light emitting side perpendicular to the first light emitting side, the first light entering side is parallel to the first light emitting side, wherein a ratio between a length of the first light entering side and a length of the first light emitting side is equal to a ratio between a length of the second light entering side and a length of the second light emitting side.

3. The illumination system of claim 2, wherein an included angle is provided between a fast axis of the first laser beam and the first light entering side, and the included angle substantially ranges from 30 degrees to 60 degrees.

4. The illumination system of claim 3, wherein the included angle is substantially 45 degrees.

5. The illumination system of claim 2, wherein the shapes of the light entering surface and the light exiting surface are square.

6. The illumination system of claim 2, wherein the ratio between the length of the first light entering side and the length of the first light emitting side is in a range from 1.2 to 3.0.

7. The illumination system of claim 1, wherein the wavelength conversion element comprises at least one wavelength conversion region, the wavelength conversion element is suitable for movement such that the at least one wavelength conversion region is moved onto the transmitting path of the second laser beam in turn, and the second laser beam is converted by the at least one wavelength conversion region into the at least one converted beam when the at least one wavelength conversion region is moved onto the transmitting path of the second laser beam.

8. The illumination system of claim 7, wherein the light combining unit is a dichroic unit, and the dichroic unit combines the at least one converted beam and the illumination beam.

9. The illumination system of claim 1, further comprising an actuator connected to the diffusion sheet and adapted to drive the diffusion sheet to move.

10. The illumination system of claim 9, wherein the actuator drives the diffusion sheet to move in a rotary manner.

11. A projection apparatus, comprising:
an illumination system comprising:
a first laser light source, adapted to generate a first laser beam;
a diffusion sheet, located on a transmitting path of the first laser beam; and
a light integration rod, having a light entering surface and a light exiting surface, wherein the diffusion sheet is located between the first laser light source and the light integration rod, the first laser beam from the diffusion sheet enters the light integration rod through the light entering surface and exits the light integration rod through the light exiting surface, and the light integration rod is adapted to convert the first laser beam into an illumination beam, and an area of the light entering surface is greater than an area of the light exiting surface,
wherein the illumination system further comprises a second laser light source, a wavelength conversion element and a light combining unit, wherein the second laser light source is adapted to generate a second laser beam, and the wavelength conversion element is disposed on a transmitting path of the second laser beam to convert the second laser beam into at least one converted beam, and the light combining unit is disposed on a transmitting path of the at least one converted beam from the wavelength conversion element and a transmitting path of the illumination beam from the light integration rod;
a light valve, disposed on a transmitting path of the illumination beam and adapted to convert the illumination beam into an image beam; and
a projection lens, disposed on a transmission path of the image beam.

12. The projection apparatus of claim 11, wherein shapes of the light entering surface and the light exiting surface are rectangular, the light entering surface has a first light entering side and a second light entering side perpendicular to the first light entering side, the light exiting surface has a first light emitting side and a second light emitting side perpendicular to the first light emitting side, the first light entering side is parallel to the first light emitting side, wherein a ratio between a length of the first light entering side and a length of the first light emitting side is equal to a ratio between a length of the second light entering side and a length of the second light emitting side.

13. The projection apparatus of claim 12, wherein an included angle is provided between a fast axis of the first laser beam and the first light entering side, and the included angle substantially ranges from 30 degrees to 60 degrees.

14. The projection apparatus of claim 13, wherein the included angle is substantially 45 degrees.

15. The projection apparatus of claim 12, wherein the shapes of the light entering surface and the light exiting surface are square.

16. The projection apparatus of claim 12, wherein the ratio between the length of the first light entering side and the length of the first light emitting side is in a range from 1.2 to 3.0.

17. The projection apparatus of claim 11, wherein the wavelength conversion element comprises at least one wavelength conversion region, the wavelength conversion element is suitable for movement, such that the at least one wavelength conversion region is moved onto the transmitting path of the second laser beam in turn, the second laser beam is converted by the at least one wavelength conversion region into the at least one converted beam when the at least one wavelength conversion region is moved onto the transmitting path of the second laser beam, and the light valve is adapted to convert the at least one converted beam and the illumination beam into the image beam.

18. The projection apparatus of claim 17, wherein the light combining unit is a dichroic unit, and the dichroic unit combines the at least one converted beam and the illumination beam.

19. The projection apparatus of claim 11, wherein the illumination system further comprises an actuator connected to the diffusion sheet and adapted to drive the diffusion sheet to move.

20. The projection apparatus of claim 19, wherein the actuator drives the diffusion sheet to move in a rotary manner.

* * * * *